United States Patent
Al Ghatta et al.

(10) Patent No.: US 6,258,452 B1
(45) Date of Patent: Jul. 10, 2001

(54) TRANSPARENT ARTICLES OF POLYESTER RESIN

(75) Inventors: Hussain Al Ghatta, Fiuggi; Enrico Ballico, Marino; Tonino Severini, Colleferro, all of (IT)

(73) Assignee: Sinco Ricerche S.p.A. (IT)

( * ) Notice: Subject to any disclaimer, the term of this patent is extended or adjusted under 35 U.S.C. 154(b) by 0 days.

(21) Appl. No.: 09/488,294

(22) Filed: Jan. 20, 2000

(30) Foreign Application Priority Data

Jan. 26, 1999 (IT) .............................. MI99A0139

(51) Int. Cl.$^7$ ....................................... B29D 7/01
(52) U.S. Cl. .......................... 428/220; 525/444; 528/305
(58) Field of Search ........................... 428/220; 525/444; 528/305

(56) References Cited

U.S. PATENT DOCUMENTS 2,965,613  12/1960  Milone et al. .................... 260/75
4,234,708  11/1980  Edelman et al. ................... 525/444

FOREIGN PATENT DOCUMENTS

| 752 437 A2 | 1/1997 | (EP) . |
| 918 064 A2 | 5/1999 | (EP) . |
| WO 97/12750 | 4/1997 | (WO) . |

*Primary Examiner*—Patricia A. Short
(74) *Attorney, Agent, or Firm*—Cook, Alex, McFarron, Manzo, Cummings & Mehler, Ltd.

(57) ABSTRACT

Transparent, articles, in particular sheets, having a thickness greater than 5 mm obtained from polyalkylene terephthalate/isophthalate resin containing 5–20% of isophthalic, acid units,. characterised by an intrinsic viscosity greater than 0.8 dl/g; a melt strength at 280° C. greater than 1 cN and a melt viscosity at 280° C. greater than 2000 Pa·s for shear rates tending to zero and not less than 200 Pa·s for shear rates of 1000 sec$^{-1}$.

22 Claims, No Drawings

TRANSPARENT ARTICLES OF POLYESTER RESIN

BACKGROUND OF THE INVENTION

The present invention relates to thick transparent articles obtained from polyalkylene terephthalate resins having characteristics suitable for the preparation of the said articles.

Thick transparent sheets obtained from amorphous thermoplastic polymers such as PVC, polymethylmethacrylate, polycarbonate and polystyrene are known.

Such sheets have various disadvantages such as, for example, the presence of plasticizers in PVC, which tend to migrate to the surface or the difficulty recycling PMMA and PC sheets, and the inflammability and fragility of PMMA sheets.

Relatively thin transparent sheets obtained from crystallizable modified PET having a cold crystallization temperature between 120°–160° C. are known.

It is known from U.S. Pat. No. 2,965,613 that copoyethylene terephthalate resins containing 5–15% isophthalic acid units having an intrinsic viscosity of 0.5–0.7 dl/g (obtained using known methods by esterification/polycondensation of mixtures of terephthalic and isophthalic acid or by transesterification with ethylene glycol of mixtures of terephthalate and dimethyl isophthalate and polycondensation of the glycol esters obtained) are crystallizable although at very much lower rate than that of polyethylene terephthalate homopolymer. Only when the unit content of isophthalic acid is very high (25–85%) are the resins no longer crystallizable. In this case Tg is very low and makes the resin unsuitable for the preparation of products having sufficiently good mechanical properties.

In U.S. Pat. No. 4,234,708 copolyethylene terephthalate/ isophthalate copolymers containing 5–15% of units deriving from isophthalic acid are described having very high intrinsic viscosity and melt strength, suitable for the preparation by blow-extrusion of thin wall transparent containers.

The copolymers are prepared by polycondensation of mixtures of terephthalic and isophthalic acid and ethylene glycol or by transesterification of mixtures of dimethyl terephthalate and isophthalate and subsequent polycondensation of the esters, in the presence of a branching agent such as, for example, trimethylolpropane and pentaerythitol and a chain terminator (benzoic acid and the like).

The intrinsic viscosity of the resin that is obtained (which is less than 0.7 dl/g) is brought to values greater than 1 dl/g by solid state polycondensation (SSP).

After SSP, the resins have a rather higher viscosity in the molten state ($10^4$–$10^5$ Pa·s at temperatures from 265° C. to 300° C. in the absence of shear forces) which falls drastically, under the action of shear forces, to values of $10^2$–$10^3$ Pa·s.

Such a high sensitivity to shear forces, although on the one hand suitable for blow moulding operations, is not suitable for the preparation by extrusion of thick products where it is necessary that the melt maintains a sufficiently high viscosity even under the action of shear forces.

Heat formed articles having a thickness of 1–20 mm obtained from sheets of crystallizable polyalkylene terephlthalate having a crystallization temperature of between 120–160° C. are known from WO-A-97/12750.

In the examples, there are heat formed sheets with the thickness of 5 mm at most.

The possibility of preparing thick transparent articles and sheets having good mechanical properties starting from polyalkylene terephthalate resins has been considered, but the problem until now has not been resolved.

SUMMARY OF THE INVENTION AND DETAILED DESCRIPTION OF THE PRESENTLY PREFERRED EMBODIMENTS

It has now been unexpectedly found that is possible to prepare transparent sheets and articles having thickness greater than 5 mm starting from copolyalkene terephthalate/ isophthalate resins containing 5–20% of units of isophthalic acid, preferably 7–15%, having the following properties:

an intrinsic viscosity greater than 0.8 dl/g;
a melt strength greater than 1 cN at 280° C.; and
a viscosity in the molten state at 280° C. greater than 2000 Pa·s for shear rates tending to 0 and not less than 200 Pa·s for shear rates of 1000 $sec^{-1}$.

The crystallinity of the articles is in general less than 5%.

Resins containing units of isophthalic acid greater than 7–8% do not have exothermic transitions in the cold crystallization DSC curves. The articles have good mechanical properties, in particular high impact resistance even at low temperatures, and optimum optical properties.

Copolyalkylene terephthalate resins having the properties indicated above are prepared according to known methods of esterification of mixtures of terephthalic and isophthalic acid with alkylene glycols with 2–8 carbon atoms, such as for example ethylene glycol, 1,4 butanediol, and polycondensation of the associated glycol esters or from mixtures of dimethyl esters by transesterification/polycondensation and by poly addition in the solid state of the resins thus obtained, operating in the presence of a dianhydride of a tetracarboxylic acid, preferably aromatic, to obtain an increase in the viscosity of the starting resin of at least 0.1 unit dl/g and melt strength values greater than 1 cN at 280° C.

The intrinsic viscosity after SSP preferably lies between 0.9–1.2 dl/g and the melt strength is preferably greater than 2 cN and in general lies between 5–20 cN, always at 280° C.

The viscosity in the molten state between 2000–3500 Pa·s at 280° C. for shear rates tending to 0 are generally suitable; Higher viscosity, however, can be utilised. The viscosity in the molten state at 280° C. corresponding with shear rates of 1000 $sec^{-1}$ is in general greater than 200 Pa·s.

The polyaddition reaction in the solid state is conducted using known methods operating at temperatures less than the melting point of the resin and greater than the Tg thereof, in general between 130°–200° C.

Before being subjected to the reaction in the solid state, the first resin is subjected to a crystallization treatment for the purpose of avoiding the phenomena of sticking in the polycondensation reactor. The working temperature lies in general between 130° and 180° C. utilizing, for example, a fluid bed.

A polyethylene terephthalate containing 8–15% of units of isophthalic acid is the preferred resin.

Beyond the statistical copolyethylene terephthalate/ isophthalate copolymers prepared as indicated above, block copolymers of various types can also be used, always having an isophthalic acid unit content of 5–20%, and are obtained, for example, by extrusion of mixtures of copolyethylene terephthalate/isophthalate having a different content of isophthalic acid units, (for example, 2% and 15% of isophthalic acid) added of pyromellitic anhydride and subsequent solid state poly addition to obtain the desired rheological characteristics.

The block copolymers thus obtained have a crystallization temperature generally lying between 130° and 180° C. depending on the isophthalic acid content.

Copolyalkylene terephthalate/isophthalate resins can be used in mixtures with compatible amorphous polymers such as, for example, ε-polycaprolactone, used in such quantities so as not to compromise the transparency characteristics of the articles.

The transparency is determined by UV/VIS spectrophotometric measurements. The transmission of light is greater than 50% in the wavelength interval from 1100 to 450 nm.

The dianhydride of the tetracarboxlic acid is mixed with the resin in quantities from 0.05 to 2% by weight, preferably 0.1–0.6%, at the output of the molten state polycondensation reactor or added in the extrusion phase of the resin.

The mixing and residence times in the extruder are relatively short (up to several minutes).

Pyromellitic dianhydride is preferred.

Examples of other dianhydrides are the dianhydrides of 1,2, 3,4-cyclobutane tetracarboxylic acid, 3,3'-, 4,4'-benzophenone tetracarboxylic acid, 2,2-bis (3,4-dicarboxyphenyl) propane, bis (3,4-dicarboxyphenyl) ether.

The transparent articles of the present invention are prepared using known moulding, extrusion, injection, thermoforming techniques or other technologies.

The articles are usable for both indoor and outdoor applications (after stabilization with UV stabilizers).

Examples of applications are panes for greenhouses, road signs, transparent parts of automobiles and machines, shelving and the like.

Transparent sheets with a thickness greater than 5 mm, and which can be up to 20 mm and more, are preferably prepared by cast-extrusion using collection rollers maintained at temperatures such as, for example, 30° C. in the first roller and higher temperatures in the other rollers, such as to be able to provide a sufficient adherence of the sheet to the rollers themselves.

Values of melt strength of the resin greater than 1 cN are necessary in order to be able to perform the operations.

Methods of Measurements

The intrinsic viscosity is determined in a 60–40 solution by weight of phenol and tetrachloroethane at 25° C. according to ASTM D 4603-86.

The rheological measurements are taken according to the ASTM D 3835 standard using a Goettfert Rheometer at a temperature of 280° C.

The melt strength is evaluated by measuring the force necessary to stretch the material extruded from the capillary of a Goettfert Rheograph 2002 Rheometer. For the measurement, a Rheotens apparatus is fitted to the output of the capillary of a Goettfert Rheograph 2002 Rheometer.

Extrusion conditions are as follows:

Piston speed: 0.2 mm/sec,

Die diameter: 2 mm,

Capillary length: 30 mm,

Test temperature: 280° C.

The measurements were taken by setting an acceleration of 2.4 cm/sec$^2$. Each test was repeated with the average result of the two being recorded.

EXAMPLE 1

A polyethylene terephthalate/isophthalate copolymer (CO-PET) containing 13.5% units of isophthalic acid (IPA), upgraded in the presence of 0.2% by weight of pyromellitic anhydride, having an I.V.=0.83 dl/g was prepared.

A CO-PET containing 13.5% IPA (obtained by esterification of mixtures of terephthalic and isophthalic acid with ethylene glycol and subsequent polycondensation of the glycol esters, having an intrinsic viscosity of 0.62 dl/g was mixed into an intermeshing and counter rotating twin screw extruder with L/D=21.5.

The temperature profile in the various zones of the extruder was 244/260/270/280/289° C., and the speed of rotation of the screws was 447 rpm.

The polymer obtained had an I.V.=0.71 dl/g. The pellets were crystallized at 173° C. for 0.5 hours and subsequently upgraded at 168° C. in a nitrogen current with a residence time of 24 hours. The intrinsic viscosity of the upgraded product was 0.83 dl/g.

The DSC curve (heating speed of 10° C./min) showed a fusion peak at 202° C. with fusion enthalpy of 37.2 J/g.

The cold crystallization DSC curve did not show any crystallization peak.

The viscosity of the polymer at 280° C. was 2500 Pa·s for shear rates tending to zero and 200 Pa·s for shear rates of 1000 sec$^{-1}$.

The melt strength of the copolymer at 280° C. was 11.5 cN.

The CO-PET thus obtained was extruded in a Breyer extruder to produce a sheet of 7.7 mm in thickness.

The extruded sheet was collected on a system of 3 rollers maintained at temperatures of 30° C. for the first, 56° C. for the second and 60° C. for the third.

The sheet obtained was transparent.

The transmission of light measured with a UV/VIS spectrophotometer was around 80% for wavelengths from 1100–700 nm; 70% for wavelengths of 700–600 nm; 70% for wavelengths of 600–450 nm.

The DSC curve (first run) showed a crystallinity of less than 2%.

Measures of impact resistance (according to ISO 190611) provided the following values at −25° C., 25° and 50° C.

|  | −25° | 25° | 50° |
|---|---|---|---|
| Peak energy (J) | 4.73 | 8.30 | 9.30 |
| Peak force (kN) | 8.15 | 8.97 | 8.50 |
| Peak deformation (mm) | 1.22 | 1.81 | 2.03 |
| Total deformation (mm) | 4.93 | 8.99 | 9.82 |
| Total energy (J) | 1.24 | 1.90 | 2.10 |
| Resilience (kJ/m) | 0.62 | 1.12 | 0.98 |

EXAMPLE 2

The test of example 1 was repeated with the single difference that a sheet of 10 mm in thickness was prepared.

The sheet was transparent and showed characteristics similar to those of the sheet of example 7 (absence of crystallinity, high impact resistance even at low temperatures).

In particular the impact resistance measurements provide the following data:

|  | −25° | 25° | 50° |
|---|---|---|---|
| Peak energy (J) | 19.40 | 16.72 | 16.58 |
| Peak force (kN) | 14.67 | 15.10 | 13.36 |
| Peak deformation (mm) | 1.49 | 2.20 | 2.30 |

-continued

|                  | −25°  | 25°   | 50°   |
|------------------|-------|-------|-------|
| Total energy (J) | 10.84 | 17.31 | 17.23 |
| Resilience (kJ/m)| 1.08  | 1.73  | 1.72  |

EXAMPLE 3

The test of example 1 was repeated with the single difference that the quantity of PMDA added to the CO-PET was 0.5% by weight.

The intrinsic viscosity after extrusion was 0.62 dl/g; after upgrading at 175° C. for 17 hours, the intrinsic viscosity was 0.85 dl/g.

The (first run) DSC curve showed a crystallization peak at 137° C. with enthalpy of 34.0 J/g and a fusion peak at 247° C. with enthalpy of 39.8 J/g.

The sheets of 7 mm thickness obtained showed characteristics similar to those of the sheet of example 1.

EXAMPLE 4

A 50% mixture by weight of CO-PET with 2.2% IPA and with an I.V.=0.8 dl/g and of CO-PET with 13.5% of IPA and with an I.V.=0.61 dl/g (IPA of the mixture 7.8% by weight) containing 0.2% by weight of PMDA was extruded in a Berstorff Ze 40 intermeshing, counter rotating twin screw extruder with a L/D=21.5 using a temperature profile in the various zones of the extruder of 246/268/272/286/289/295/300° C. and a screw speed of 447 rpm.

The I.V. of the extruded polymer was 0.70 dl/g.

The pellets were crystallized at 185° C. for 0.5 h and then upgraded at 175° C. in a nitrogen current for 16 hours. The I.V of the upgraded polymer was 0.85 dl/g.

The (first run) DSC curve showed a crystallization peak at 155.9° C. with enthalpy of 30.8 J/g and a fusion peak at 233.8° C. with enthalpy of 31.7 J/g.

The cold crystallization DSC curve showed a peak at 177.2° C. with enthalpy of 37.2 J/g.

A lamination test was performed in the conditions of example 1 obtaining a sheet of a thickness 7.7 mm with characteristics of transparency and impact resistance similar to those of the sheet of example 1.

The crystallinity of the sheet was less than 2%.

EXAMPLE 5

The test of example 4 was repeated with the single difference that a sheet having a thickness of 10 mm was produced.

The sheet was transparent and had high impact resistance characteristics.

EXAMPLE 6

The test of example 4 was repeated with the single difference that a CO-PET with 2.2% IPA having an I.V.=0.59 dl/g was used.

The results obtained are similar to those of example 4.

Comparative Example 1

The test of example 1 was repeated with the single difference that CO-PET with 13.5% of IPA having an I.V.=0.82 dl/g was used, which had been obtained by upgrading in the absence of PMDA.

The DSC curve (first run) showed a fusion peak at 203° C. with fusion enthalpy of 37.9 J/g.

The cold crystallization DSC curve did not show any crystallization peak.

The melt strength measurement at 280° C. was not determinable (melt strength too low).

The viscosity of the CO-PET in the molten state at 280° C. and with shear rates tending to zero was 500 Pa·s and with shear rates of 1000 sec$^{-1}$ was 150 Pa·s.

It was not possible to perform lamination tests operating in the conditions of example 1 in that the extruded sheet did not adhere to the winding rollers because of the low melt strength.

Comparative Example 2

The test of example 4 was repeated with the single difference that a content of 0.04% PMDA was used: in the mixture of CO-PET with 2.2% and 13.5% IPA.

After extrusion the polymer had an I.V.=0.69 dl/g and, after upgrading in a nitrogen current at 175° C. for 31 hours (after crystallization at 185° C. for 0.5 hours), of 0.85 dl/g.

The DSC curve (first run) showed a crystallization peak at 143.3° C. with enthalpy of 31.8 J/g and a fusion peak at 235.9° C. with enthalpy of 34.5 J/g.

The cold crystallization curve showed a peak at 180.6° C. with enthalpy of 36.9 J/g.

The melt strength measurement at 280° C. could not be performed (melt strength too low).

It was not possible to conduct a lamination test in the conditions of example 1 in that the sheet did not adhere to the winding rollers.

What is claimed is:

1. A transparent product with a thickness greater than 5 mm having a crystallinity less than 5% obtained from copolyalklyene terephthalate/isophthalate resin comprising 5–20% of units derived from isophthalic acid and having the following characteristics:
   intrinsic viscosity greater than 0.8 dl/g;
   melt strength greater than 1 cN (measured at 280° C.);
   melt viscosity at 280° C. greater than 2000 Pa·s in the absence of shear forces and not less than 200 Pa·s in correspondence with shear rates of 1000 sec$^{-1}$.

2. Products according to claim 1, in which the melt strength lies between 5–20 cN and the melt viscosity lies between 2000–3500 Pa·S for shear rates tending to zero.

3. Products according to claim 2, in which the content of isophthalic acid units is 7–15%.

4. Products according to claim 2, in which the the copolyalkylene terephthalate/isophthalate is a copolymer obtained by known methods of esterification/polycondensation of terephthalic and isophthalic acid mixtures or by transesterification with alkylene glycols of mixtures of dimethyl terephthalate and isophthalate and polycondensation of the esters obtained by solid state polyaddition of the copolymer in the presence of a dianhydride of a tetracarboxlic acid to obtain intrinsic viscosity values greater than 0.8 dl/g and melt strength of at least 1 cN.

5. Products according to claim 2, in which the copolyalkylene terephthalates/isophthalates are block copolymers obtained by extrusion of mixtures of copolyalkylene terephthalates/isophthalates having various contents of isophthalic acid units in the presence of pyromellitic anhydrides and subsequent solid state polyaddition.

6. Products according to claim 2, in which the copolyalklyene terephthalates/isophthalates are chosen from copolyethylene terephthalates/isophthalates.

7. Products according to claim 2, in the form of sheets having a thickness of 5–20 mm.

8. Products according to claim 1, in which the content of isophthalic acid units is 7–15%.

9. Products according to claim 8, in which the the copolyalkylene terephthalate/isophthalate is a copolymer obtained by known methods of esterification/polycondensation of terephthalic and isophthalic acid mixtures or by transesterification with alkylene glycols of mixtures of dimethyl terephthalate and isophthalate and polycondensation of the esters obtained by solid state polyaddition of the copolymer in the presence of a dianhydride of a tetracarboxlic acid to obtain intrinsic viscosity values greater than 0.8 dl/g and melt strength of at least 1 cN.

10. Products according to claim 8, in which the copolyalkylene terephthalates/isophthalates are block copolymers obtained by extrusion of mixtures of copolyalkylene terephthalates/isophthalates having various contents of isophthalic acid units in the presence of pyromellitic anhydrides and subsequent solid state polyaddition.

11. Products according to claim 8, in which the copolyalklyene terephthalates/isophthalates are chosen from copolyethylene terephthalates/isophthalates.

12. Products according to claim 8, in the form of sheets having a thickness of 5–20 mm.

13. Products according to claim 1, in which the copolyalkylene terephthalate/isophthalate is a copolymer obtained by known methods of esterification/polycondensation of terephthalic and isophthalic acid mixtures or by transesterification with alkylene glycols of mixtures of dimethyl terephthalate and isophthalate and polycondensation of the esters obtained and by solid state polyaddition of the copolymer in the presence of a dianhydride of a tetracarboxlic acid to obtain intrinsic viscosity values greater than 0.8 dl/g and melt strength of at least 1 cN.

14. Products according to claim 13, in which the copolyalkylene terephthalates/isophthalates are block copolymers obtained by extrusion of mixtures of copolyalkylene terephthalates/isophthalates having various contents of isophthalic acid units in the presence of pyromellitic anhydrides and subsequent solid state polyaddition.

15. Products according to claim 13, in which the copolyalklyene terephthalates/isophthalates are chosen from copolyethylene terephthalates/isophthalates.

16. Products according to claim 13, in the form of sheets having a thickness of 5–20 mm.

17. Products according to claim 1, in which the copolyalkylene terephthalates/isophthalates are block copolymers obtained by extrusion of mixtures of copolyalkylene terephthalates/isophthalates having various contents of isophthalic acid units in the presence of pyromellitic anhydrides and subsequent solid state polyaddition.

18. Products according to claim 17, in which the copolyalklyene terephthalates/isophthalates are chosen from copolyethylene terephthalates/isophthalates.

19. Products according to claim 17, in the form of sheets having a thickness of 5–20 mm.

20. Products according to claim 1, in which the copolyalklyene terephthalates/isophthalates are chosen from copolyethlyene terephthalates/isophthalates.

21. Products according to claim 20, in the form of sheets having a thickness of 5–20 mm.

22. Products according to claim 1, in the form of sheets having a thickness of 5–20 mm.

* * * * *